United States Patent
Kumagai

(10) Patent No.: US 8,458,251 B2
(45) Date of Patent: Jun. 4, 2013

(54) CONFERENCE AIDED SYSTEM, INPUT BOARD AND CONTROL METHOD THEREOF, AND PROGRAM

(75) Inventor: Takekazu Kumagai, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1380 days.

(21) Appl. No.: 11/565,015

(22) Filed: Nov. 30, 2006

(65) Prior Publication Data

US 2007/0143402 A1  Jun. 21, 2007

(30) Foreign Application Priority Data

Dec. 2, 2005 (JP) ................................. 2005-349450

(51) Int. Cl.
*G06F 15/173* (2006.01)

(52) U.S. Cl.
USPC ......................................................... 709/204

(58) Field of Classification Search
USPC .......................................... 709/217, 226, 204
See application file for complete search history.

(56) References Cited

U.S. PATENT DOCUMENTS

| 5,299,033 A | * | 3/1994 | Watanabe et al. | 358/497 |
| 5,471,318 A | * | 11/1995 | Ahuja et al. | 358/400 |
| 5,572,728 A | * | 11/1996 | Tada et al. | 1/1 |
| 5,996,003 A | * | 11/1999 | Namikata et al. | 709/205 |
| 6,518,960 B2 | * | 2/2003 | Omura et al. | 345/177 |
| 7,483,945 B2 | * | 1/2009 | Blumofe | 709/204 |

FOREIGN PATENT DOCUMENTS

| JP | 2000-165577 | | 6/2000 |
| JP | 2003-032409 | A | 1/2003 |
| JP | 2003-333251 | A | 11/2003 |
| JP | 2004-023318 | | 1/2004 |
| JP | 2004-112066 | A | 4/2004 |
| JP | 2005-129976 | A | 5/2005 |
| JP | 2005-268992 | A | 9/2005 |

* cited by examiner

*Primary Examiner* — David Eng
(74) *Attorney, Agent, or Firm* — Cowan, Liebowitz & Latman, P.C.

(57) ABSTRACT

This invention provides a conference aided system, which is configured by interconnecting a conference management server, an input board having a board surface and used to input handwritten information, and an image storage device via a network, and aids execution of process associated with a conference. The server stores conference information including address information indicating the storage location of image data used in a conference. The server acquires conference information corresponding to an acquisition request of conference information in response to this request sent from the input board, and transmits the conference information to the input board. The input board receives the conference information corresponding to the acquisition request from the server. The input board acquires image data in the image storage device on the network, which is designated by the address information in the conference information. The input board renders the image data on its board surface.

20 Claims, 13 Drawing Sheets

CONFERENCE AIDED SYSTEM, INPUT BOARD AND CONTROL METHOD THEREOF, AND PROGRAM

BACKGROUND OF THE INVENTION

1. Field of the Invention

The present invention relates to a conference aided system which is configured by interconnecting a conference management server, an input board which has a board surface and is used to input handwritten information, and an image storage apparatus via a network, and aids execution of process associated with a conference, an input board and a control method thereof, and a program.

2. Description of the Related Art

In recent years, in order to effectively utilize a conference room, the use of a conference room reservation system using a computer has prevailed. Also, an input board such as an electronic blackboard, whiteboard, or the like is often connected to a network.

For example, Japanese Patent Laid-Open No. 2000-165577 implements backup (storage) of image data by storing image data recognized from a rendering surface on the electronic blackboard. Also, there has been proposed a conference aided apparatus with high usability, which allows to search and use the stored image data based on information such as a conference or the like which can be specified, and can store and manage image data of a conference note and the like without any filing.

As a blackboard which can be connected to a network, Japanese Patent Laid-Open No. 2004-23318 proposes a configuration which renders externally entered image data on an electronic blackboard.

However, the above prior arts do not propose any device for improving the use efficiency of the electronic blackboard and smoothly managing a conference by using the electronic blackboard set in a conference room in collaboration with the conference room reservation system.

For example, Japanese Patent Laid-Open No. 2000-165577 can store image data rendered on the electronic blackboard, but cannot render image data such as stored conference references and the like on the electronic blackboard.

When a plurality of organizations share a few conference rooms in an office, if one organization wants to hold a conference for a long period of time, it is often the case that it cannot occupy one conference room continuously but must move to another conference room during the conference.

For example, when one organization wants to hold conference A from 9:00 to 12:00, it can hold the conference from 9:00 to 10:00 using the first conference room and from 10:00 to 12:00 using the second conference room if there is no conference room which can be continuously used from 9:00 to 12:00. In such situation, it is convenient to also use, in the second conference room, the contents written on the electronic blackboard in the first conference room.

When identical participant periodically hold a conference, it is convenient to reproduce, in the next conference, the contents written on the electronic blackboard in the previous conference.

SUMMARY OF THE INVENTION

The present invention has been made to solve the aforementioned problems, and has as its object to provide a conference aided system which can improve the use efficiency of an input board such as an electronic blackboard or the like, and can smoothly manage a conference, an input board and control method thereof, and a program.

According to the present invention, the foregoing object is attained by providing a conference aided system, which is configured by interconnecting a conference management server, an input board having a board surface and used to input handwritten information, and an image storage device via a network, and aids execution of process associated with a conference, wherein the conference management server comprises:
   a storage unit adapted to store conference information including address information which indicates a storage location of image data used in a conference; and
   a transmission unit adapted to transmit, to the input board, the conference information corresponding to an acquisition request of the conference information, which is acquired from the storage unit in response to the acquisition request from the input board, and the input board comprises:
   a reception unit adapted to receive the conference information corresponding to the acquisition request from the conference management server;
   an acquisition unit adapted to acquire image data in the image storage device on the network, which is designated by the address information in the conference information received by the reception unit; and
   a rendering unit adapted to render the image data acquired by the acquisition unit on the board surface of the input board.

In a preferred embodiment, the storage unit stores image data to be stored in a designated order.

In a preferred embodiment, the image storage device is included in a multi-functional peripheral equipment on the network.

In a preferred embodiment, the image storage device is included in a server on the network, which builds a shared file system.

In a preferred embodiment, the conference management server further comprises:
   a first authentication unit adapted to authenticate a user of a client which requests access to the conference management server.

In a preferred embodiment, the storage unit further stores, as the conference information:
   user information associated with a user;
   group information associated with a group including a plurality of users;
   conference entity information indicating the users as members of a conference;
   conference room information associated with a conference room to be managed;
   equipment information associated with an equipment connected on the network; and
   schedule information associated with a schedule upon using the conference room.

In a preferred embodiment, the input board further comprises:
   an operation unit adapted to input information; and
   a second authentication unit adapted to authenticate a user who operates the input board, and
   the second authentication unit transmits user information input from the operation unit to the conference management server, and authenticates the user who operates the input board based on a comparison result between that user information and the user information managed in the conference information by the conference management server.

In a preferred embodiment, the input board further comprises:
an operation unit adapted to input information, and
when a conference start instruction is input via the operation unit, the acquisition unit acquires image data in the image storage device on the network, which is designated by the address information in the conference information received by the reception unit.

In a preferred embodiment, when the authentication by the second authentication unit has succeeded, the acquisition unit acquires image data in the image storage device on the network, which is designated by the address information in the conference information received by the reception unit.

In a preferred embodiment, the input board further comprises:
an operation unit adapted to input information; and
a board surface read unit adapted to read an image on the board surface of the input board, and
when an instruction to re-use the image on the board surface of the input board placed in a current conference room is input from the operation unit, the board surface read unit reads the image on the board surface of the input board, and stores the read image in the image storage device on the network, which is designated by the address information in the conference information corresponding to the current conference.

In a preferred embodiment, the board surface read unit stores the image read from the board surface of the input board in the image storage device on the network, which is designated by the address information in the conference information corresponding to a next conference, so that the image is to be rendered first on the input board in a conference room used to hold the next conference.

According to the present invention, the foregoing object is attained by providing an input board which is connected to a conference management server that aids execution of process associated with a conference via a network, comprising:
a reception unit adapted to receive conference information associated with a conference that uses the input board from the conference management server;
an acquisition unit adapted to acquire image data in an image storage device on the networks which is designated by the address information in the conference information received by the reception unit; and
a rendering unit adapted to render the image data acquired by the acquisition unit on a board surface of the input board.

According to the present invention, the foregoing object is attained by providing a method of controlling an input board which is connected to a conference management server that aids execution of process associated with a conference via a network, comprising:
a reception step of receiving conference information associated with a conference that uses the input board from the conference management server;
an acquisition step of acquiring image data in an image storage device on the network, which is designated by the address information in the conference information received in the reception step; and
a rendering step of rendering the image data acquired in the acquisition step on a board surface of the input board.

According to the present invention, the foregoing object is attained by providing a program stored in a computer-readable memory, for making a computer execute control of an input board which is connected to a conference management server that aids execution of process associated with a conference via a network, comprising:
a reception step of receiving conference information associated with a conference that uses the input board from the conference management server;
an acquisition step of acquiring image data in an image storage device on the network, which is designated by the address information in the conference information received in the reception step; and
a rendering step of rendering the image data acquired in the acquisition step on a board surface of the input board.

Further features of the present invention will become apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numeral expressions and numerical values set forth in these embodiments do not limit the scope of the present invention unless it is specifically stated otherwise.

<First Embodiment>

Figure 1:
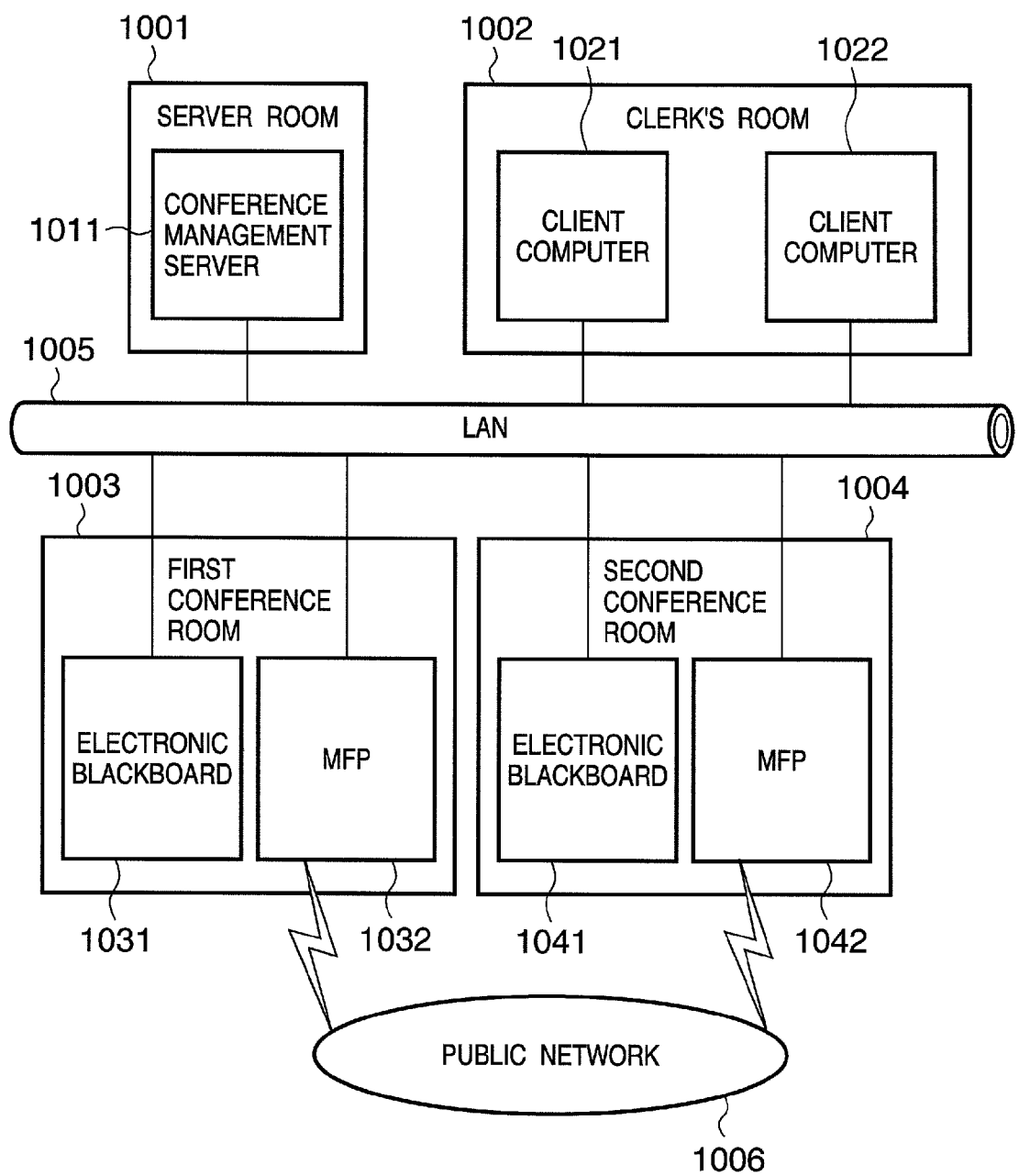
FIG. 1 is a network diagram for explaining the network arrangement of a conference aided system according to the first embodiment of the present invention.

FIG. 1 is a network diagram for explaining the network arrangement of a conference aided system according to the first embodiment of the present invention.

In an office, a server room 1001, clerk's room 1002, first conference room 1003, and second conference room 1004 are set up. A conference management server 1011 is equipped in the server room 1001. Client computers 1021 and 1022 are equipped in the clerk's room 1002. Note that these client computers 1021 and 1022 serve as conference management clients which use the conference aided system.

An electronic blackboard 1031 and MFP 1032 are equipped in the first conference room 1003. An electronic blackboard 1041 and MFP 1042 are equipped in the second conference room 1004.

The conference management server 1011, client computers 1021 and 1022, electronic blackboard 1031, MEP 1032, electronic blackboard 1041, and MFP 1042 are accommodated in (connected to) a LAN 1005, and can communicate with each other.

The MFPs 1032 and 1042 are connected to a public network 1006, and can make facsimile (FAX) communications with other FAX apparatuses and MFPs connected to the public network 1006.

The electronic blackboards 1031 and 1041 have equivalent functions, and display operation information in response to user's operations and control displayed information. The MFPs 1032 and 1042 also have equivalent functions.

Each of the electronic blackboards 1031 and 1041 allows the user to freely render an image and the like on a board surface using a pointing tool such as a paint-stick or the like. Each of the electronic blackboards 1031 and 1041 has a function of forming image data by electronically reading an image rendered on the board surface and storing the image data in each of boxes (image storage devices) of the MFPs 1032 and 1042 connected to the LAN 1005. Also, each of the electronic blackboards 1031 and 1041 has a function of acquiring the image data stored in each of the boxes of the MFPs 1032 and 1042 via the LAN 1005, and rendering the acquired image data on the board surface. Furthermore, each of the electronic blackboards 1031 and 1041 has a function of inquiring the conference management server 1011 of the storage locations of image data such as conference reference images and the like via the LAN 1005.

Figure 3:
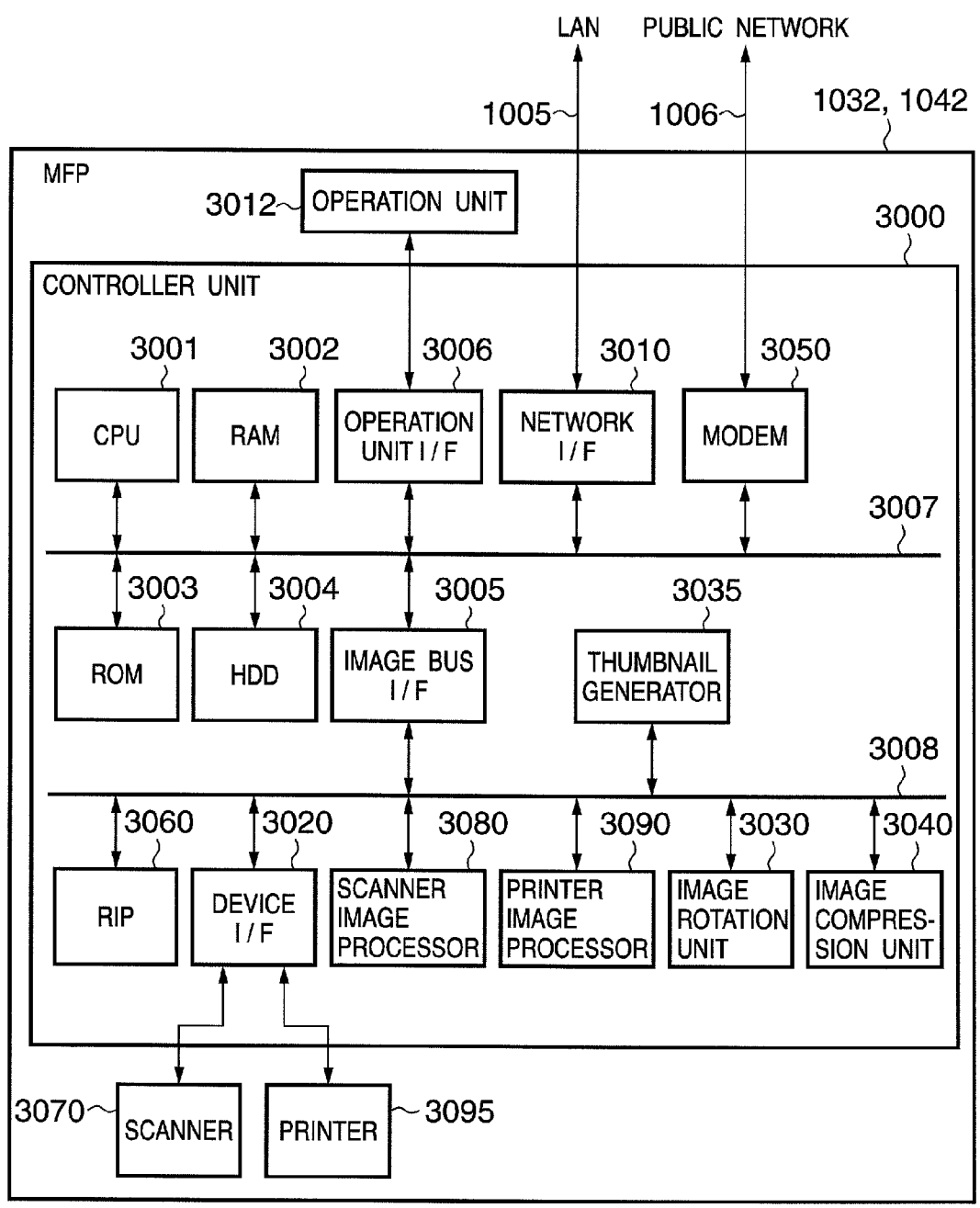
FIG. 3 is a block diagram showing the arrangement of principal part of a multi-functional peripheral equipment (MFP) according to the first embodiment of the present invention.

Each of the MFPs 1032 and 1042 has a copy function and FAX function, and also a data transmission function of reading a document image and transmitting the read image data to the respective apparatuses on the LAN 1005. Since each of the MFPs 1032 and 1042 has a PDL function, it can receive a PDL image designated from a computer connected on the LAN 1005 and can print it out. Each of the MFPs 1032 and 1042 can store an image read by itself and a PDL image designated from a computer connected on the LAN 1005 in a designated box area of a hard disk 3004 (FIG. 3). Each of the MFPs 1032 and 1042 can print an image stored in the box area.

The MFP 1032 receives data read by, e.g., the MFP 1042 via the LAN 1005, and can store the received image data in its hard disk 3004 or can print it out. The MFP 1032 receives image data from the client computer 1021 or 1022 via the LAN 1005, and can store the received image data in itself or can print it out. The MFP 1032 receives image data from the electronic blackboard 1031 or 1041 via the LAN 1005, and can store the received image data in itself or can print it out.

The conference management server 1011 allows the client computers 1021 and 1022 to reserve conference rooms, and notifies the electronic blackboards 1031 and 1042 of the storage locations of image data as conference references.

The client computers 1021 and 1022 are connected to the conference management server 1011 via the LAN 1005 to change management data associated with conferences and to reserve conferences. The client computers 1021 and 1022 can store image data in the MFP 1032 via the LAN 1005. Also, the client computers 1021 and 1022 can receive image data read by the MFP 1032 via the LAN 1005, and can modify and edit the received image data.

Note that each client computer comprises standard building components (e.g., a CPU, RAM, ROM, hard disk, external storage device, network interface, display, keyboard, mouse, and the like) equipped in a general-purpose computer.

The principal arrangement of the electronic blackboards 1031 and 1032 will be described below using FIG. 2.

Figure 2:
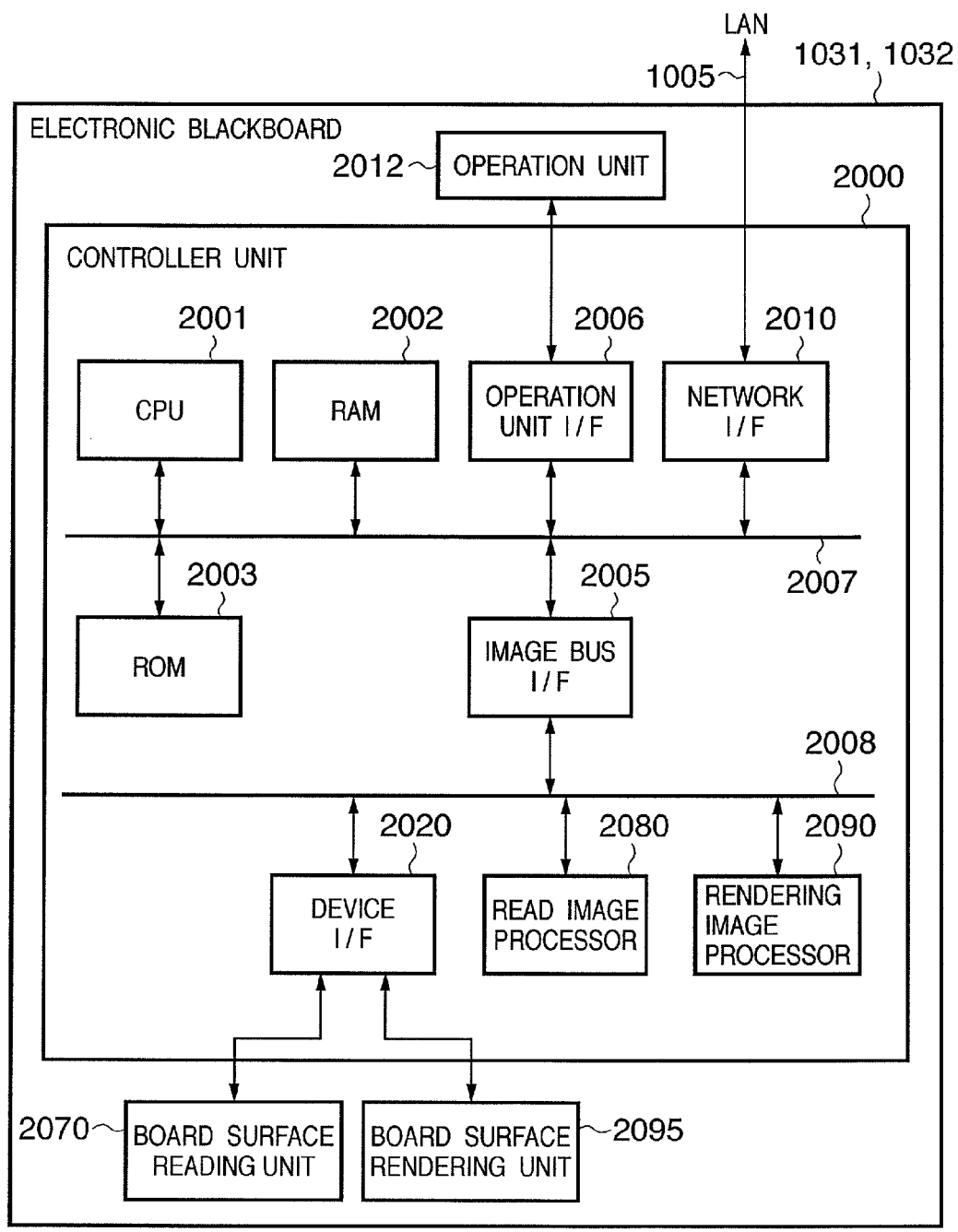
FIG. 2 is a block diagram showing the arrangement of principal part of an electronic blackboard according to the first embodiment of the present invention.

FIG. 2 is a block diagram showing the arrangement of principal part of the electronic blackboard according to the first embodiment of the present invention.

A controller unit 2000 connects a board surface reading unit 2070 which reads the contents on the board surface to form image data, and a board surface rendering unit 2095 which renders an image on the board surface. The controller unit 2000 controls to transmit images and image data read by the board surface reading unit 2070 to the MFPs 1032 and 1042 via the LAN 1005. The controller unit 2000 controls to acquire image data from the MFPs 1032 and 1042 via the LAN 1005, and to render the acquired image data on the board surface using the board surface rendering unit 2095.

Note that the board surface is, for example, a whiteboard, and the board surface reading unit 2070 can read locus images such as characters and the like rendered on the board surface. On the other hand, the board surface rendering unit 2095 comprises, e.g., a plotter, and can render images on the board surface or a paper sheet set on the board surface using a pen.

The board surface reading unit 2070 and the board surface rendering unit 2095 are not limited to these arrangements. For example, the board surface reading unit 2070 may comprise a reader which reads an image on the board surface by an image sensing device such as a camera or the like, and the board surface rendering unit 2095 may comprise a rendering device which renders the read image onto the board surface by a projection device such as a projector or the like.

Furthermore, the board surface reading unit 2070 and the board surface rendering unit 2095 may comprise a touch panel including a display unit and operation unit. In this case, the board surface reading unit 2070 reads an image obtained from coordinate information input from the touch panel, and the board surface rendering unit 2095 renders the read image on the touch panel.

More specifically, the controller unit 2000 has a CPU 2001. The CPU 2001 launches an operating system (OS) by a boot program stored in a ROM 2003. The CPU 2001 implements various kinds of process by executing application programs stored in the ROM 2003 on this OS. Various kinds of process include those which are shown in the flowcharts to be described later. The CPU 2001 uses a RAM 2002 as its work area. The RAM 2002 provides an image memory area for temporarily storing image data in addition to the work area.

To the CPU 2001, the ROM 2003 and RAM 2002, an operation unit I/F (interface) 2006, a network I/F 2010, and an image bus I/F 2005 are connected via a system bus 2007.

The operation unit I/F 2006 is an interface with an operation unit 2012 having operation buttons and a display screen, and outputs data to be displayed on the operation unit 2012 to it. The operation unit I/F 2006 outputs information input by the user at the operation unit 2012 to the CPU 2001.

The network I/F 2010 is connected to the LAN 1005, and exchanges information with respective apparatuses on the LAN 1005 via the LAN 1005.

The image bus I/F 2005 is a bus bridge, which connects the system bus 2007 and an image bus 2008 which transfers image data at high speed, and converts the data structure. The image bus 2008 comprises, e.g., a PCI bus or IEEE1394.

On the image bus 2008, a device I/F 2020, read image processor 2080, and rendering image processor 2090 are connected. The board surface reading unit 2070 and board surface rendering unit 2095 are connected to the device I/F 2020, which converts the data structure. The read image processor 2080 applies image process such as correction, modification, edit, and the like to the input image data. The rendering image processor 2090 applies process such as correction, resolution conversion, and the like to rendering image data.

The principal arrangement of the MFPs 1032 and 1042 will be described below using FIG. 3.

FIG. 3 is a block diagram showing the arrangement of principal part of the MFP according to the first embodiment of the present invention.

A controller unit 3000 connects a scanner 3070 as an image input device and a printer 3095 as an image output device. The controller unit 3000 controls to implement the copy function of printing out image data read by the scanner 3070 using the printer 3095. The controller unit 3000 also controls to exchange image information and device information by connecting the LAN 1005 and public network 1006.

More specifically, the controller unit 3000 comprises a CPU 3001. The CPU 3001 launches an operating system (OS) by a boot program stored in a ROM 3003. The CPU 3001 implements various kinds of process by executing application programs stored in the HDD (hard disk drive) on this OS. Various kinds of process include those which are shown in the flowcharts to be described later. The CPU 3001 uses a RAM 3002 as its work area. The RAM 3002 provides an image memory area for temporarily storing image data in addition to the work area. The HDD 3004 stores image data together with the application programs.

To the CPU 3001, the ROM 3003 and RAM 3002, the HDD 3004, an operation unit I/F 3006, a network I/F 3010, a modem 3050, and an image bus I/F 3005 are connected via a system bus 3007.

The operation unit I/F 3006 is an interface with an operation unit 3012 having a touch panel, and outputs data to be displayed on the operation unit 3012 to it. The operation unit I/F 3006 outputs information input by the user at the operation unit 3012 to the CPU 3001.

The network I/F 3010 is connected to the LAN 1005, and exchanges information with respective apparatuses on the LAN 1005 via the LAN 1005. The modem 3050 is connected to the public network 1006, and exchanges information via the public network 1006.

The image bus I/F 3005 is a bus bridge, which connects the system bus 3007 and an image bus 3008 which transfers image data at high speed, and converts the data structure. The image bus 3008 comprises, e.g., a PCI bus or IEEE1394.

On the image bus 3008, a raster image processor (to be abbreviated as RIP hereinafter) 3060, device I/F 3020, scanner image processor 3080, and printer image processor 3090 are connected. Furthermore, on the image bus 3008, an image rotation unit 3030, thumbnail generator 3035, and image compression unit 3040 are connected.

The RIP 3060 is a processor which rasterizes a rendering command such as a PDL code or the like into a bitmap image. The scanner 3070 and printer 3095 are connected to the device I/F 3020, which converts the synchronous system/asynchronous system of image data.

The scanner image processor 3080 applies image process such as correction, modification, edit, and the like to the input image data. The printer image processor 3090 applies process such as correction, resolution conversion, and the like to rendered image data. The image rotation unit 3030 rotates image data. The image compression unit 3040 compresses multi-valued image data into, e.g., JPEG data, and binary image data into, e.g., data such as JBIG, MMR, MH, or the like, and executes their decompression process.

The software configuration (functional arrangement) of the conference management server 1011 will be described below using FIG. 4.

Figure 4:
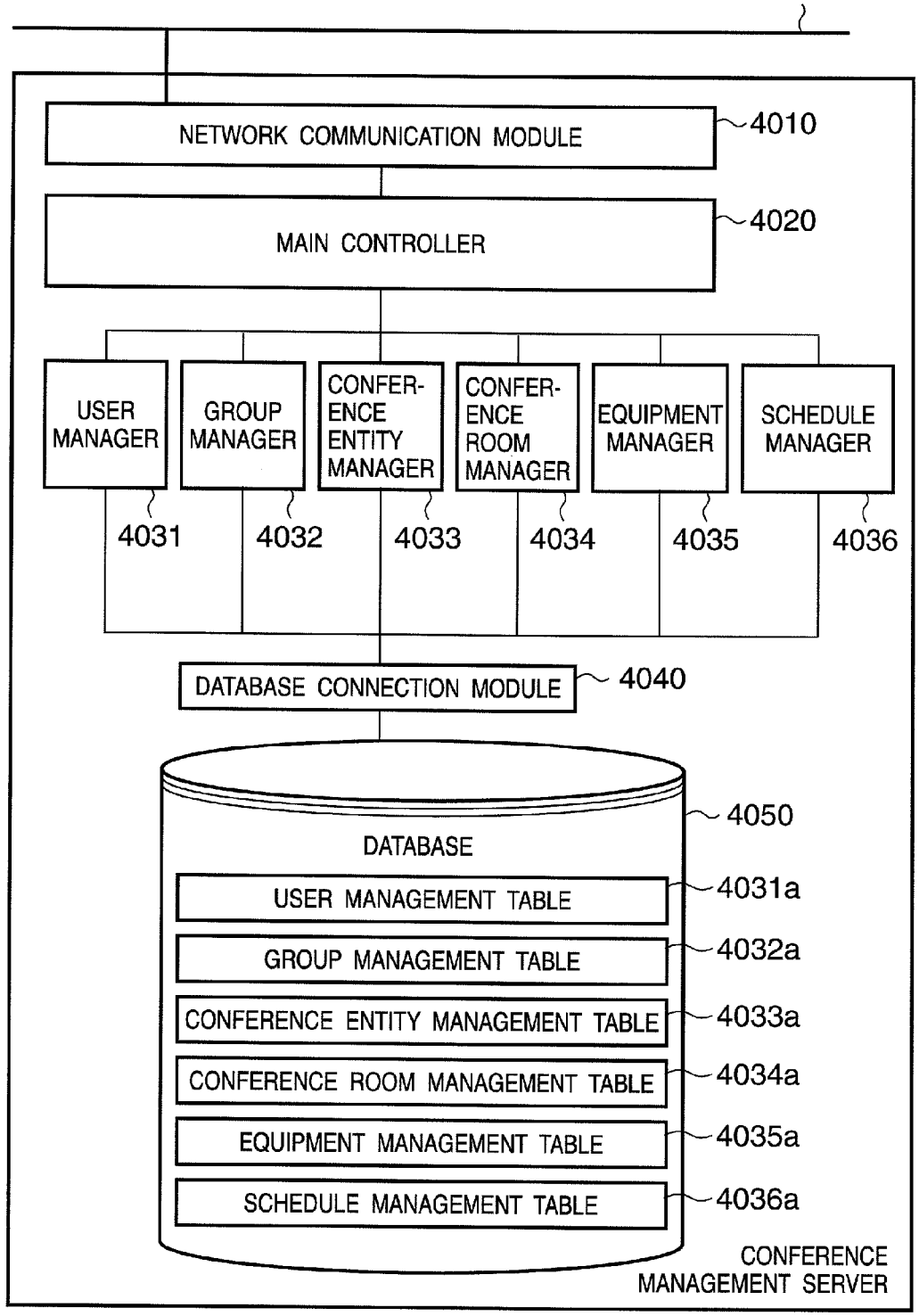
FIG. 4 is a block diagram for explaining the software configuration of a conference management server according to the first embodiment of the present invention.

FIG. 4 is a block diagram for explaining the software configuration of the conference management server according to the first embodiment of the present invention.

A network communication module 4010 exchanges image data and data associated with conference reservation with the client computers 1021 and 1022 and the electronic blackboards 1031 and 1041 connected to the LAN 1005 via the LAN 1005.

A main controller 4020 executes various kinds of process in response to process requests which come from the client computers 1021 and 1022 and the electronic blackboards 1031 and 1041 via the LAN 1005. More specifically, the main controller 4020 controls a user manager 4031, group manager 4032, conference entity manager 4033, conference room manager 4034, equipment manager 4035, and schedule manager 4036, and returns their process results.

A WWW browser, which is generally popularly used, is installed in each of the client computers 1021 and 1022. The conference management server 1011 comprises an HTTP server function, which is configured as a Web application.

That is, each of the client computers 1021 and 122 displays HTML data generated by the conference management server 1011 on its Web browser, and the user operates the HTML data displayed on the Web browser. With this operation, the user can send the following request to the conference management server 1011.

When the request source is the electronic blackboard 1031 or 1041, the conference management server 1011 receives the request contents as an XML file in a pre-defined format, and returns the process result as an XML file. That is, the conference management server 1011 provides remote operations of XML Web services.

The user manager 4031 provides a user management function. A user management table 4031a in a database 4050 is used to manage information associated with users.

The user management table 4031a can store a plurality of user records including information associated with users. One user record includes a user ID which has a unique value in the table, a user name, a password, and a user type. The user type is information indicating whether the user is an administrator or general user.

Note that the user management function includes process for creating a new user, deleting a user, updating user information, and so forth.

The group manager 4032 provides a group management function. A group management table 4032a in the database 4050 is used to manage information associated with groups.

The group management table 4032a can store a plurality of group records including information associated with groups. One group record includes a group ID, which has a unique value in the table, a group name, an attending user list, and the like.

Note that the group management function includes process for creating a new group, deleting a group, updating group information, and so forth.

The conference entity manager 4033 provides a conference entity management function. A conference entity management table 4033a in the database 4050 is used to manage information associated with conference entities.

The conference entity management table 4033a can store a plurality of conference entity records including information associated with conference entities. One conference entity record includes a conference entity ID which has a unique value in the table, a conference entity name, a member user/group list, and the like.

Note that the conference entity management function includes process for creating a new conference entity, deleting a conference entity, updating conference entity information, and so forth. Also, the conference entity is a combination of users/groups which constitute a conference.

The conference room manager 4034 provides a conference room management function. A conference room management table 4034a in the database 4050 is used to manage information associated with conference rooms.

The conference room management table 4034a can store a plurality of conference room records including information associated with conference rooms. One conference room record includes a conference room ID which has a unique value in the table, a conference room name, a list of equipments placed in the conference room, and the like.

Note that the conference room management function includes process for creating a new conference room, deleting a conference room, updating conference room information, and so forth.

The equipment manager 4035 provides an equipment management function. An equipment management table 4035a in the database 4050 is used to manage information associated with equipments.

The equipment management table 4035a can store a plurality of equipment records including information associated with equipments. One equipment record includes an equipment ID which has a unique value in the table, an equipment name, equipment type, an IP address of the equipment, and the like. The equipment type includes information such as an electronic blackboard, MFP, and the like.

Note that the equipment management function includes process for creating a new equipment, deleting an equipment, updating equipment information, and so forth.

The schedule manager 4036 provides a schedule management function. A schedule management table 4036a in the database 4050 is used to manage information associated with schedules.

The schedule management table 4036a can store a plurality of schedule records including information associated with schedules. One schedule record includes a schedule ID which has a unique value in the table, a schedule name (conference name and the like), a conference entity ID, a conference room ID, a conference reference storage location, an equipment list used during a conference, a conference start time, a conference end time, a reservation user ID, and the like.

Note that the conference reference storage location includes information that specifies the storage location (storage destination (address information of the storage device) of image data to be rendered on the board surface of the electronic blackboard during the conference, i.e., the ID and box number of the MFP, image numbers in the box, and the like. To render a plurality of images of the conference reference on the board surface, those images can be stored and managed in the storage device to have serial numbers. Also, the equipment list used during the conference registers a list of equipment IDs used during the conference.

Note that the schedule management function includes process for creating a new schedule, deleting a schedule, updating schedule information, and so forth. Note that the schedules are controlled so that records which have overlapping time zones of the start and end times even partially in an identical conference room cannot be created.

For example, when a schedule from AM 10:00 to 12:00, Jul. 1, 2005 in the first conference room is already created, a schedule from AM 9:00 to 11:00, Jul. 1, 2005 or that from AM 11:00 to 12:00, Jul. 1, 2005 in the first conference room cannot be additionally created.

Also, a new schedule which includes overlapping time zones of the start and end times for an identical conference entity cannot be created.

For example, when a schedule from AM 10:00 to 12:00, Jul. 1, 2005 in the first conference room is already created for conference entity A, a schedule from AM 9:00 to 11:00, Jul. 1, 2005 in the second conference room cannot be created for conference entity A.

A database connection module 4040 is a processor for acquiring records by accessing various tables stored in the database 4050. More specifically, the database connection module 4040 executes process via the components such as the user manager 4031, group manager 4032, conference entity manager 4033, conference room manager 4034, equipment manager 4035, and schedule manager 4036 in accordance with the required process.

Note that pieces of information configured by various tables stored in the database 4050 will be collectively referred to as conference information hereinafter.

The process in the conference management server 1011 will be described below using FIG. 5.

Figure 5:
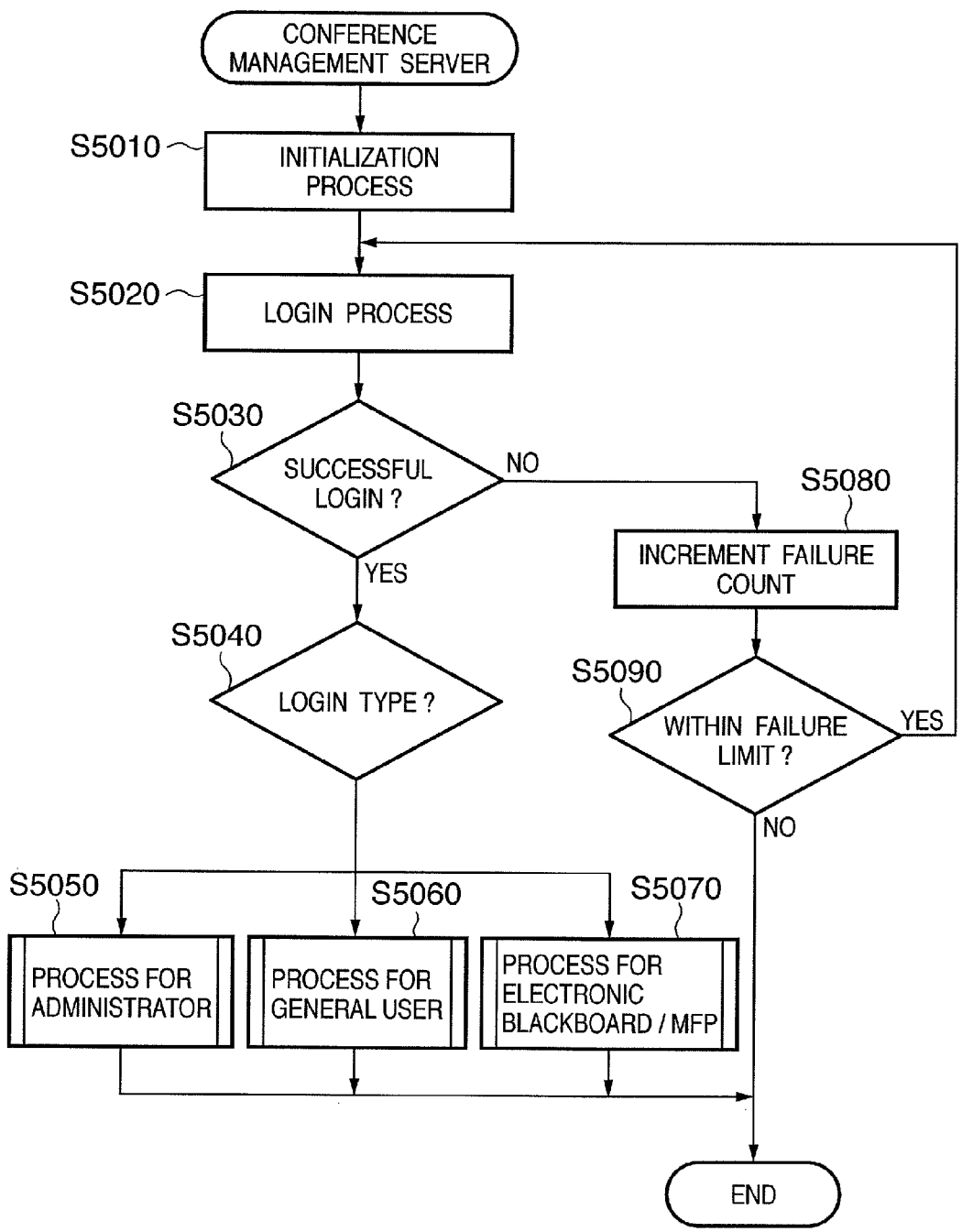
FIG. 5 is a flowchart showing the process in the conference management server according to the first embodiment of the present invention.

FIG. 5 is a flowchart showing the process in the conference management server according to the first embodiment of the present invention.

In step S5010, the main controller 4020 assures variables used by a program, and initializes them. In step S5020, the main controller 4020 issues a login (user authentication) request to the client.

Note that the client includes the client computers 1021 and 1022, electronic blackboards 1031 and 1041, and MFPs 1032 and 1042.

In step S5030, the main controller 4020 receives a login input from the client, and inquires the user management table 4031a in the database 4050 to confirm if the login user is an authorized user. If it is determined that the login user is an authorized user (YES in step S5030), the process advances to step S5040.

On the other hand, if it is determined that the login user is not an authorized user (NO in step S5030), the process advances to step S5080, and the main controller 4020 increments a login failure count. The main controller 4020 checks in step S5090 if the login failure count is equal to or smaller than a prescribed count (failure limit). If the login failure count is larger than the prescribed count (NO in step S5090), the process ends. On the other hand, if the login failure count is equal to or smaller than the prescribed count (YES in step S5090), the process returns to step S5020 to accept the login input again.

Upon login from the client computer 1021 or 1022, whether the user logs in as the administrator or general user can be designated.

If a general user attempts to log in as an administrator, that login is determined unauthorized, resulting in a failure. If the administrator attempts to log in as a general user, login as a general user is authorized.

Upon login from the electronic blackboard 1031 or 1041 or the MFP 1032 or 1042, whether or not the login user is an authorized user and whether or not he or she is a participant of the conference which is currently held in the conference room where that equipment is placed are considered as authentication conditions.

In step S5040, the main controller 4020 checks the login type. In this case, the main controller 4020 determines whether access is made from the client computer, electronic blackboard, or MFP. In case of access from the client computer, the main controller 4020 also checks if the user is an administrator or general user, and the process branches depending on the checking result.

In case of access from the administrator, the process advances to step S5050 to execute process for the administrator. In case of access from a general user, the process advances to step S5060 to execute process for a general user. In case of access from the electronic blackboard/MFP, the process advances to step S5070 to execute process for the electronic blackboard/MFP.

Details of the process for the administrator in step S5050 will be described below using FIG. 6.

Figure 6:
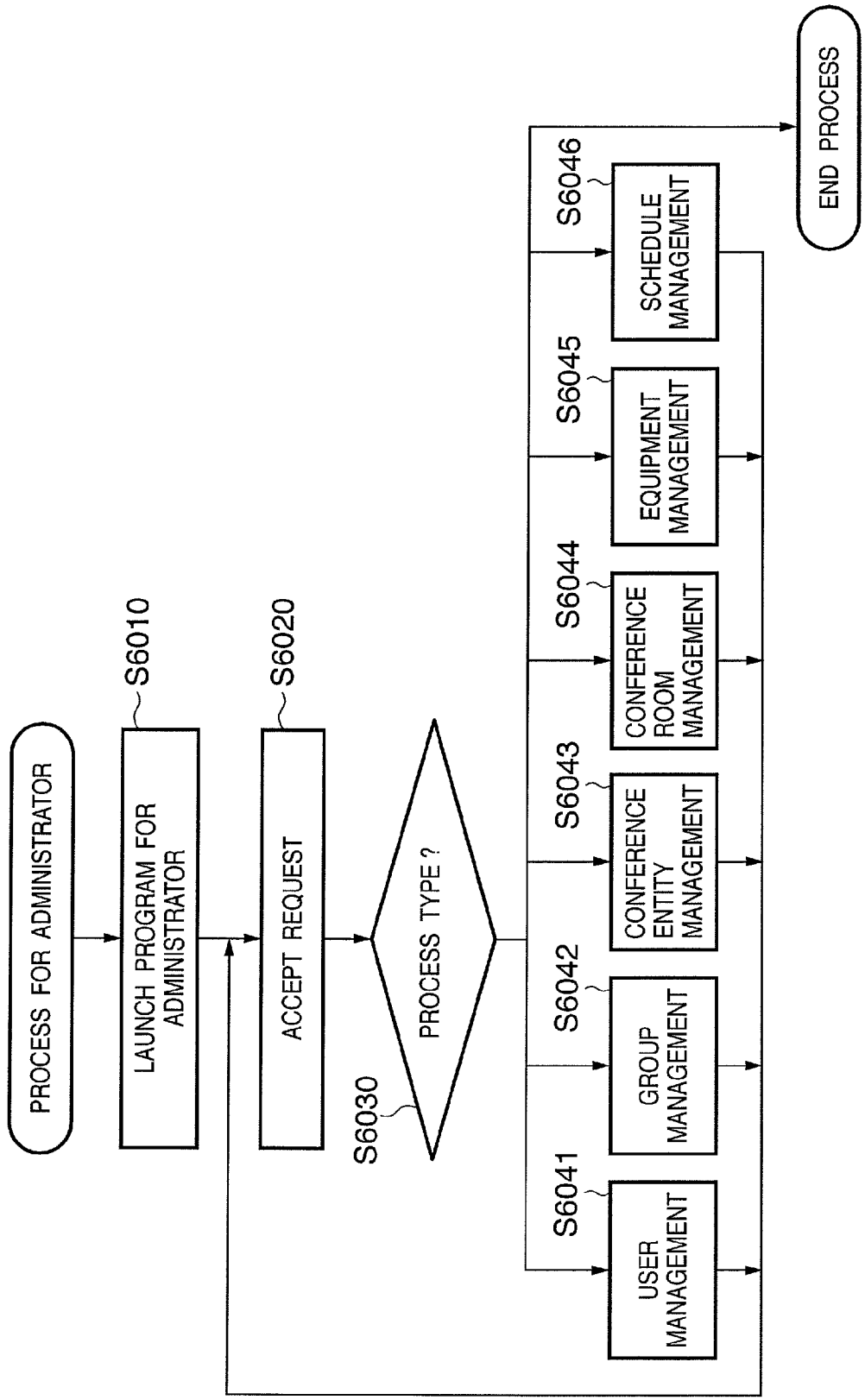
FIG. 6 is a flowchart showing details of process for an administrator according to the first embodiment of the present invention.

FIG. 6 is a flowchart showing the details of the process for the administrator according to the first embodiment of the present invention.

This process is executed when the user logs in from, e.g., the client computer 1021 or 1022 to the conference management server 1011 as the administrator. Process with the client computer 1021 will be exemplified below.

In step S6010, the main controller 4020 launches a program for the administrator, and sends a response to the client computer 1021. The program for the administrator provides the user management function, group management function, conference entity management function, equipment management function, and schedule management function. The program for the administrator creates an HTML page which allows the user to select these functions, and returns it to the client computer 1021.

In step S6020, the program accepts a process request from the client computer 1021.

In step S6030, the program discriminates the process type of the process requested from the client computer 1021, and the process branches.

In case of user management process, the process advances to step S6041. In case of group management process, the process advances to step S6042. In case of conference entity management process, the process advances to step S6043. In case of conference room management process, the process advances to step S6044. In case of equipment management process, the process advances to step S6045. In case of schedule management process, the process advances to step S6046. In case of end process, this process ends.

In the user management process in step S6041, the program creates a user management HTML page used to create a new user, to delete a user, and to update user information, and returns it to the client computer 1021. The program executes process in response to an operation to this user management HTML page. The process executed by this program is reflected in the user management table 4031*a* stored in the database 4050 according to the process contents.

In the group management process in step S6042, the program creates a group management HTML page used to create a new group, to delete a group, and to update group information, and returns it to the client computer 1021. The program executes process in response to an operation to this group management HTML page. The process executed by this program is reflected in the group management table 4032*a* stored in the database 4050 according to the process contents.

In the conference entity management process in step S6043, the program creates a conference entity management HTML page used to create a new conference entity, to delete a conference entity, and to update conference entity information, and returns it to the client computer 1021. The program executes process in response to an operation to this conference entity management HTML page. The process executed by this program is reflected in the conference entity management table 4033*a* stored in the database 4050 according to the process contents.

In the conference room management process in step S6044, the program creates a conference room management HTML page used to create a new conference room, to delete a conference room, and to update conference room information, and returns it to the client computer 1021. The program executes process in response to an operation to this conference room management HTML page. The process executed by this program is reflected in the conference room management table 4034*a* stored in the database 4050 according to the process contents.

In the equipment management process in step S6045, the program creates a equipment management HTML page used to create a new equipment, to delete an equipment, and to update equipment information, and returns it to the client computer 1021. The program executes process in response to an operation to this equipment management HTML page. The process executed by this program is reflected in the equipment management table 4035*a* stored in the database 4050 according to the process contents.

In the schedule management process in step S6046, the program creates a schedule management HTML page used to create a new schedule, to delete a schedule, and to update schedule information, and returns it to the client computer 1021. The program executes process in response to an operation to this schedule management HTML page. The process executed by this program is reflected in the schedule management table 4036*a* stored in the database 4050 according to the process contents.

Details of the process for the general user in step S5060 will be described below using FIG. 7.

Figure 7:
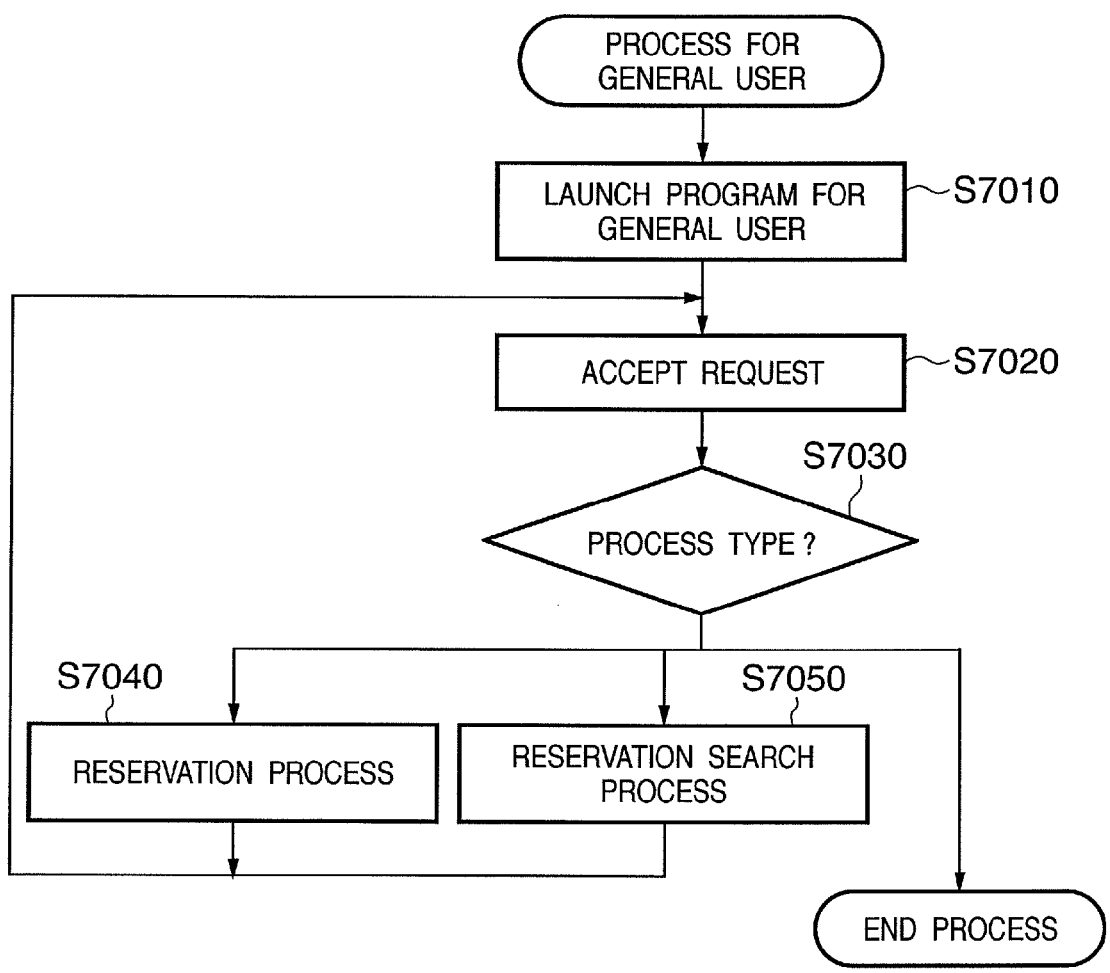
FIG. 7 is a flowchart showing details of process for a general user according to the first embodiment of the present invention.

FIG. 7 is a flowchart showing details of the process for the general user according to the first embodiment of the present invention.

This process is executed when the user logs in from, e.g., the client computer 1021 or 1022 to the conference management server 1011. The process with the client computer 1021 will be exemplified below.

In step S7010, the main controller 4020 launches a program for the general user, and sends a response to the client computer 1021. The program for the general user provides a conference room reservation function and reservation search function. The program for the general user creates an HTML page which allows the user to select these functions, and returns it to the client computer 1021.

In step S7020, the program accepts a process request from the client computer 1021.

In step S7030, the program discriminates a process type of the process requested from the client computer 1021, and the process branches.

If the process type is conference room reservation, the process branches to step S7040. If the process type is reservation search, the process branches to step S7050. In case of end process, this process ends.

In the reservation process in step S7040, the program creates a schedule reservation HTML page used to create a new schedule, to delete the schedule, the reservation made by the user himself or herself, and to update that schedule, and returns it to the client computer 1021. The program executes process in response to an operation to this schedule reservation HTML page. The process executed by this program is reflected in the schedule management table 4036a stored in the database 4050 according to the process contents.

In the reservation search process in step S7050, the program creates a schedule search HTML page used to search for a list of reservations made by the client itself, a list of conference rooms which can be reserved in a desired time zone, and the like, and returns it to the client computer 1021. The program executes process in response to an operation to this schedule search HTML page.

Details of the process for the electronic blackboard/MFP in step S5070 will be described below using FIG. 8.

Figure 8:
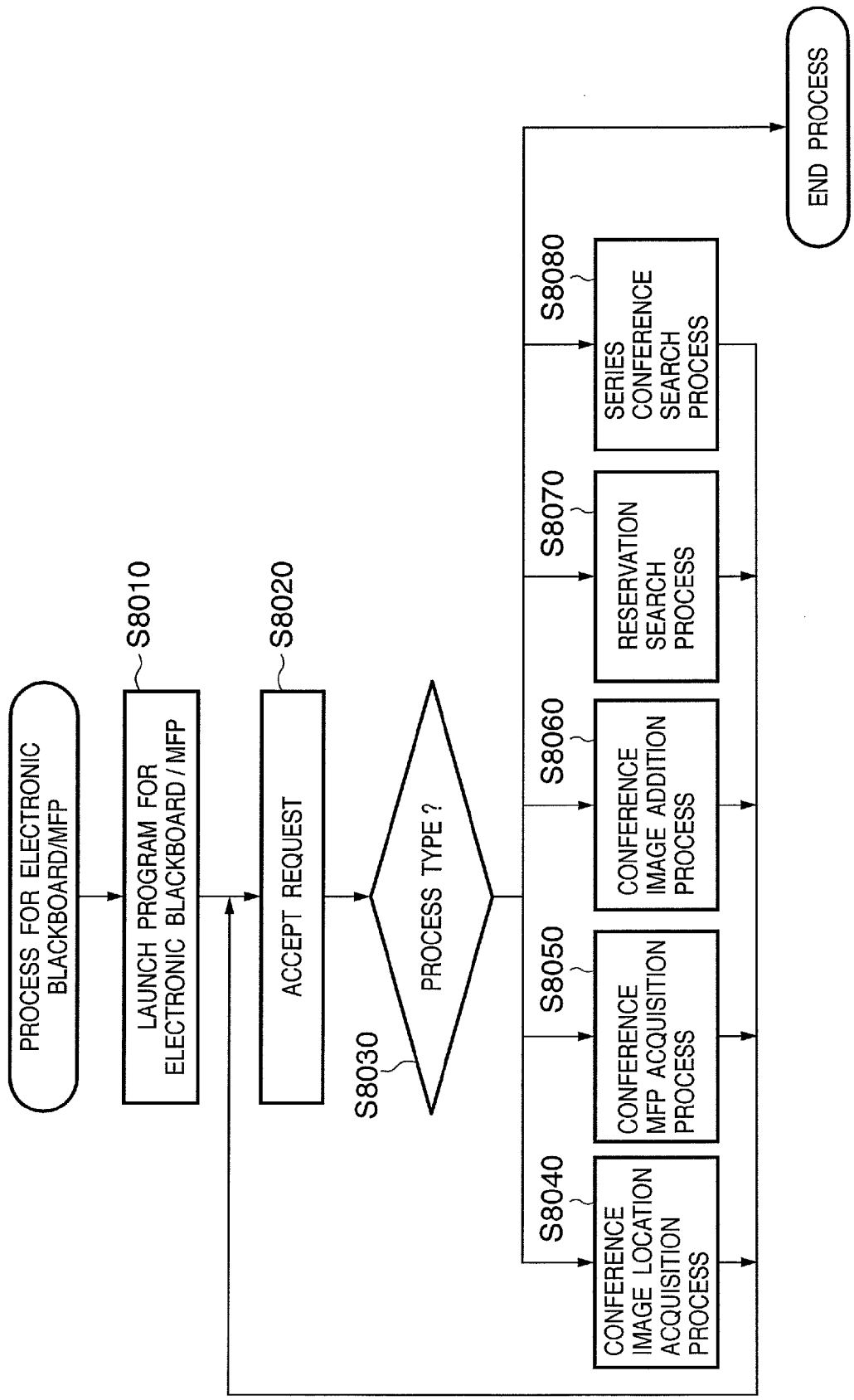
FIG. 8 is a flowchart showing details of process for the electronic blackboard/MFP according to the first embodiment of the present invention.

FIG. 8 is a flowchart showing details of the process for the electronic blackboard/MFP according to the first embodiment of the present invention.

This process is executed when the user logs in from, e.g., the electronic blackboard 1031 or 1041 or the MFP 1032 or 1042 to the conference management server 1011. The process with the electronic blackboard 1031 or the MFP 1032 will be exemplified below.

In step S8010, the main controller 4020 launches a program for the electronic blackboard/MFP, and sends a response to the client computer 1021. The program for the electronic blackboard/MFP provides a conference image location acquisition function, conference MFD acquisition function, conference image addition function, reservation search function, and series conference search function.

In step S8020, the program accepts a process request from the electronic blackboard 1031 or MFP 1032.

In step S8030, the program discriminates a process type of the process requested from the electronic blackboard 1031 or MFP 1032, and the process branches.

If the process type indicates the conference image location acquisition function, the process branches to step S8040. If the process type indicates the conference MFP acquisition function, the process branches to step S8050. If the process type indicates the conference image addition function, the process branches to step SS060. If the process type indicates the reservation search function, the process branches to step S8070. If the process type indicates the series conference search function, the process branches to step S8080. In case of end process, this process ends.

In the conference image location acquisition process in step S8040, the program accepts a conference image location request, and executes corresponding process. Upon acceptance of the conference image location acquisition request, the client designates the schedule ID.

The conference management server 1011 retrieves schedule information having the designated schedule ID with reference to the schedule management table 4036a. The server 1011 returns the conference reference storage location included in the retrieved schedule information to the request source (electronic blackboard 1031 or MPP 1032).

In the conference MFP acquisition process in step S8050, the program accepts a conference MFP acquisition request, and executes corresponding process. Upon acceptance of the conference MFP acquisition request, the user designates the schedule ID from the electronic blackboard 1031 or MFP 1032.

The conference management server 1011 retrieves schedule information having the designated schedule ID with reference to the schedule management table 4036a. The server 1011 returns the address information of the MFP for a conference included in the retrieved schedule information to the request source (electronic blackboard 1031 or MFP 1032).

In the conference image addition process in step S8060, the program executes the image addition process for a conference reference. The user sends the schedule ID and information indicating the conference reference storage location and its display order from the electronic blackboard 1031 or MFP 1032. With this process, the contents of the database 4050 are updated.

The conference management server 1011 retrieves schedule information having the designated schedule ID with reference to the schedule management table 4036a. The server 1011 returns the address information of the MFP for a conference included in the retrieved schedule information to the request source (electronic blackboard 1031 or MFP 1032).

In the reservation search process in step S8070, the program accepts a schedule search request, and executes that process. The user at the electronic blackboard 1031 or MFP 1032 designates, as the schedule search conditions, the current time and the ID of the conference room where the equipments are placed.

The conference management server 1011 retrieves conference room information having the designated conference room ID with reference to the conference room management table 4034a. Furthermore, the server 1011 retrieves schedule information for the retrieved conference room information with reference to the schedule management table 4036a, and returns the retrieved schedule information to the request source (electronic blackboard 1031 or MFP 1032).

In the series conference search process in step S8080, upon searching for a series conference which holds the current conference (by a given conference entity) successively (or in series) by moving to another conference room, the program returns the schedule ID of that conference to the request source (electronic blackboard 1031 or MFP 1032). The user designates the schedule ID of the current conference as the schedule search condition from the electronic blackboard 1031 or MFP 1032.

The conference management server 1011 retrieves schedule information having the schedule ID of the designated conference with reference to the schedule management table 4036a. Next, the server 1011 retrieves the schedule ID having the same conference entity ID as that which indicates the conference entity included in the retrieved schedule information with reference to the schedule management table 4036a. The server 1011 returns the retrieved schedule ID to the request source (electronic blackboard 1031 or MFP 1032).

Note that the series conference means a conference which is held in series by an identical conference entity using different time zones or conference rooms. For example, when a conference by an identical conference entity is held every week using an identical conference room, this conference is a series conference. Also, when a conference by an identical conference entity is held on the same day using a plurality of conference rooms, this conference is also a series conference.

The schedule ID retrieved by the series conference search process is basically the schedule ID of a conference which is scheduled to be held after the current conference. Therefore, the number of schedule IDs to be retrieved is not limited to one. The reason why the series conference which is scheduled to be held in the future is to be searched for is that the user demand to search for a future series conference which is scheduled to be held rather than the current conference is stronger.

Note that the schedule IDs of the conferences which have already been held may be managed as a log. Therefore, the schedule IDs of the series conferences which have already been held may be retrieved in addition to those of series conferences which are scheduled to be held.

The process to be executed on the electronic blackboard will be described below using FIG. 9.

Figure 9:
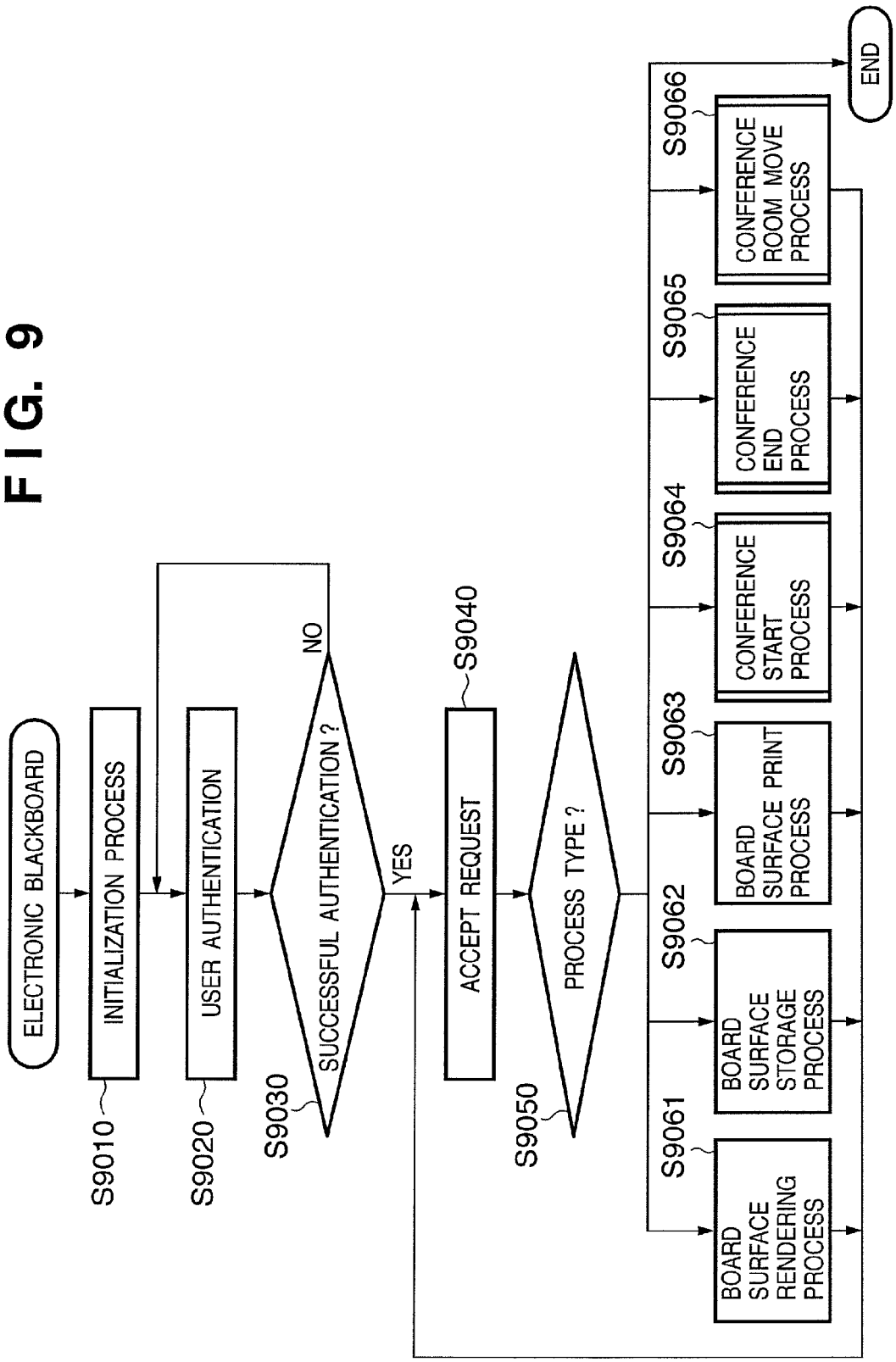
FIG. 9 is a flowchart showing the process to be executed by the electronic blackboard according to the first embodiment of the present invention.

FIG. 9 is a flowchart showing the process to be executed on the electronic blackboard according to the first embodiment of the present invention.

In step S9010, the CPU 2001 executes initialization process to initialize variables and to launch respective functional blocks.

In step S9020, the CPU 2001 executes user authentication process. The user inputs user authentication information (user name and password) by operating the operation unit 2012, and the CPU 2001 sends an inquiry about user authentication to the conference management server 1011.

In step S9030, the CPU 2001 checks if the user authentication has succeeded. If the user authentication has succeeded (YES in step S9030), the process advances to step S9040. On the other hand, if the user authentication has failed (NO in step S9030), the process returns to step S9020 to prompt the user to input user authentication information again. If the failure count exceeds a predetermined count, the authentication process may be aborted.

In step S9040, the CPU 2001 executes process for waiting for user's operations. When the user operates the operation unit 2012, the CPU 2001 discriminates the operation contents in step S9050, and branches processes according to the operation contents.

If the operation contents indicate a board surface rendering operation, the process advances to step S9061. If the operation contents indicate a board surface save operation, the process advances to step S9062. If the operation contents indicate a board surface print operation, the process advances to S9063. If the operation contents indicate a conference start operation, the process advances to S9064. If the operation contents indicate a conference end operation, the process advances to S9065. If the operation contents indicate a conference room move operation, the process advances to S9066. In case of end process, this process ends.

In the board surface rendering process in step S9061, the CPU 2001 externally acquires an image designated as the board surface rendered image, and renders the acquired image on the board surface. Note that the acquisition source (e.g., a predetermined box of the MFP 1032) of the board surface rendered image must be designated in advance.

In the board surface save process in step S9062, the CPU 2001 generates image data by reading an image rendered on the board surface, and stores the generates image data in a storage location which is designated in advance. Note that the storage location (e.g., a predetermined box of the MFP 1032) must be designated in advance. In addition, the CPU 2001 temporarily stores that image data and address information indicating the storage location in the RAM 2002.

In the board surface print process in step S9063, the CPU 2001 generates image data by reading an image rendered on the board surface, and prints the generated image data using the MFP which is designated in advance. Note that the MFP used in the print process must be designated in advance. In addition, the CPU 2001 temporarily stores the equipment information of the MFP in the RAM 2002.

In step S9064, the CPU 2001 executes the conference start process. Note that this process will be described later using FIG. 10.

In the conference end process in step S9065, the CPU 2001 clears, from the RAM 2002, the address information of the conference reference storage location and the equipment information of the MFP for a conference, which are stored in the RAM 2002 in the conference start process.

In step S9066, the CPU 2001 executes the conference room move process. Note that this process will be described later using FIG. 11.

Details of the conference start process in step S9064 will be described below using FIG. 10.

Figure 10:
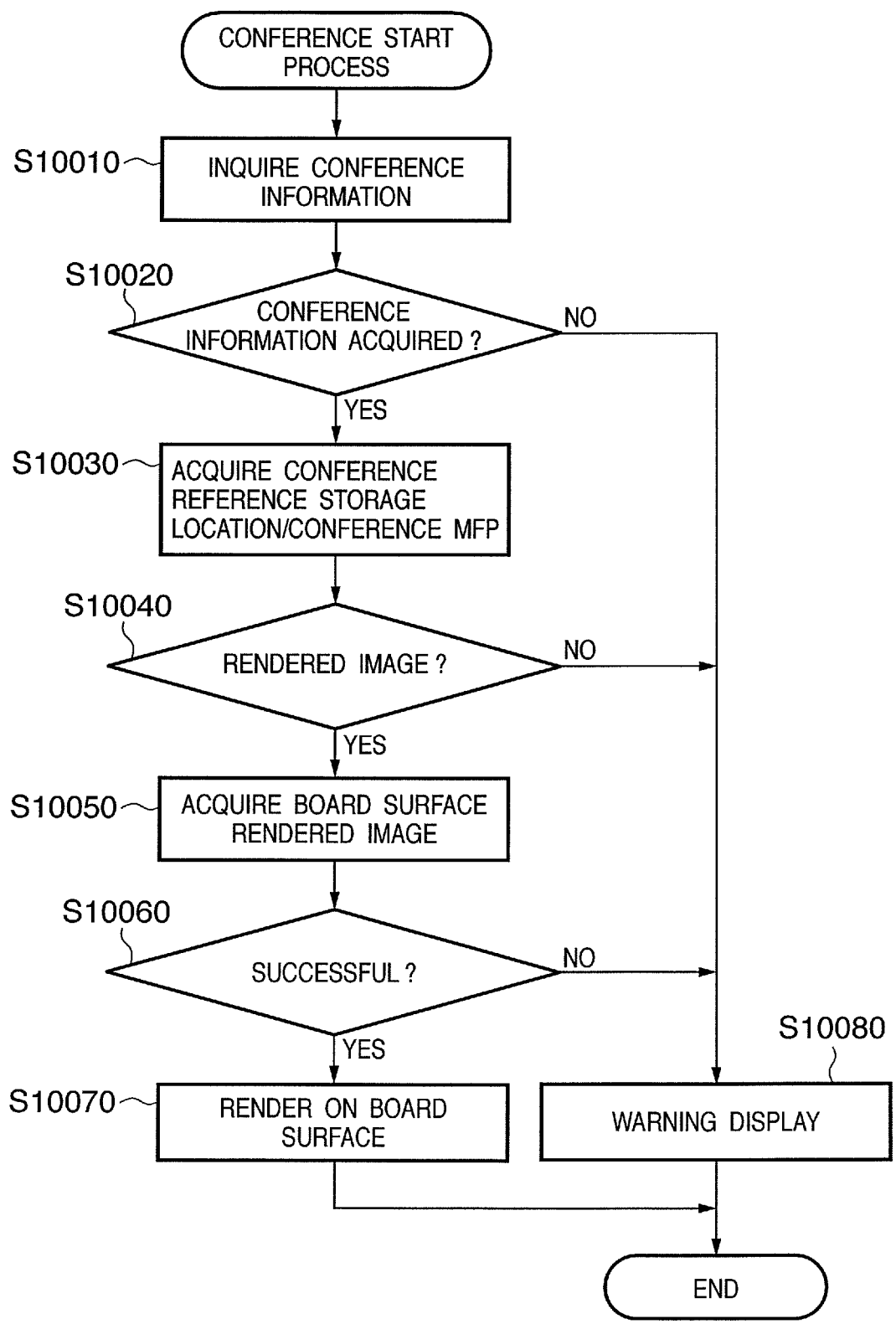
FIG. 10 is a flowchart showing details of conference start process according to the first embodiment of the present invention.

FIG. 10 is a flowchart showing details of the conference start process according to the first embodiment of the present invention.

In step S10010, the CPU 2001 sends an inquiry to the conference management server 1011 and acquires conference information. In this case, the CPU 2001 sends the current time and conference room ID, and acquires the corresponding schedule ID as the conference information.

The CPU 2001 checks in step S10020 if the conference information including the schedule ID was acquired in step S10010. If the conference information was not acquired (NO in step S10020), the process advances to step S10080, and the CPU 2001 executes a warning display on the operation unit 2012, thus ending the process. On the other hand, if the conference information can be acquired (YES in step S10020), the process advances to step S10030.

In step S10030, the CPU 2001 sends an inquiry to the conference management server 1011, and acquires the conference reference storage location and the equipment information of the MFP for a conference. At this time, the inquiry request sent to the conference management server 1011 includes the schedule ID. The CPU 2001 stores the acquired conference reference storage location and equipment information of the MFP for a conference in the RAM 2002 so that it can refer to the acquired information later.

As will be described later, when it is scheduled in advance that the current conference is held as a series conference of the previous conference, the conference reference storage location included in the schedule ID of the current conference stores the conference reference rendered on the electronic blackboard in the previous conference. Hence, the process in step S10030 can acquire the conference reference rendered on the electronic blackboard in the previous conference by acquiring the conference reference storage location included in the schedule ID of the current conference.

Note that the process in step S10030 may execute the following process in place of acquisition of the conference reference storage location included in the schedule ID of the current conference. That is, when a conference was previously held by an identical conference entity, the conference reference rendered on the electronic blackboard in that conference is stored in the conference reference storage location included in the schedule ID of that conference. Hence, in such case, the conference reference stored in the conference reference storage location included in the schedule ID of that previous conference can be acquired as that to be rendered on the electronic blackboard in the current conference.

With this configuration, the conference management server 1011 retrieves the schedule ID having the same conference entity ID as that of the conference of the conference entity included in the received schedule ID with reference to the schedule management table 4036a. As a result, the server 1011 can acquire the conference reference storage location and equipment information of the MFP for a conference included in the retrieved schedule ID.

As the schedule ID to be retrieved, a schedule ID at a time nearest to the current time is acquired. As a result, the conference reference rendered on the electronic blackboard in a conference immediately before the current conference can be acquired. However, the present invention is not limited to the schedule ID at the nearest time.

For example, if there are a plurality of conferences which were previously held by an identical conference entity, the CPU 2001 may present the schedule IDs of the respective conferences in the form of a list on the operation unit 2012 of the electronic blackboard 1031, and may prompt the user to select a desired schedule ID. In this case, the CPU 2001 may present thumbnail images of the conference references stored in the conference reference storage locations included in the respective schedule IDs together on the operation unit 2012. By presenting the thumbnail images, the user can select a desired conference reference to render it on the board surface of the electronic blackboard 1031 after he or she confirms the contents of the conference references.

The description will revert to FIG. 10.

The CPU 2001 checks in step S10040 if the conference reference storage location required to store the board surface rendered image to be rendered on the board surface is set. If the conference reference storage location is not set (NO in step S10040), the process advances to step S10080 to execute a warning display on the operation unit 2012, thus ending the process. On the other hand, if the conference reference storage location is set (YES in step S10040), the process advances to step S10050.

In step S10050, the CPU 2001 acquires the board surface rendered image to be rendered on the board surface from the conference reference storage location.

The CPU 2001 checks in step S10060 if acquisition of the board surface rendered image has succeeded. If acquisition of the board surface rendered image has failed (NO in step S10060), the process advances to step S10080 to execute a warning display on the operation unit 2012, thus ending the process. On the other hand, if acquisition of the board surface rendered image has succeeded (YES in step S10060), the process advances to step S10070 to render the acquired board surface rendered image on the board surface.

Details of the conference room move process in step S9066 will be described below using FIG. 11.

Figure 11:
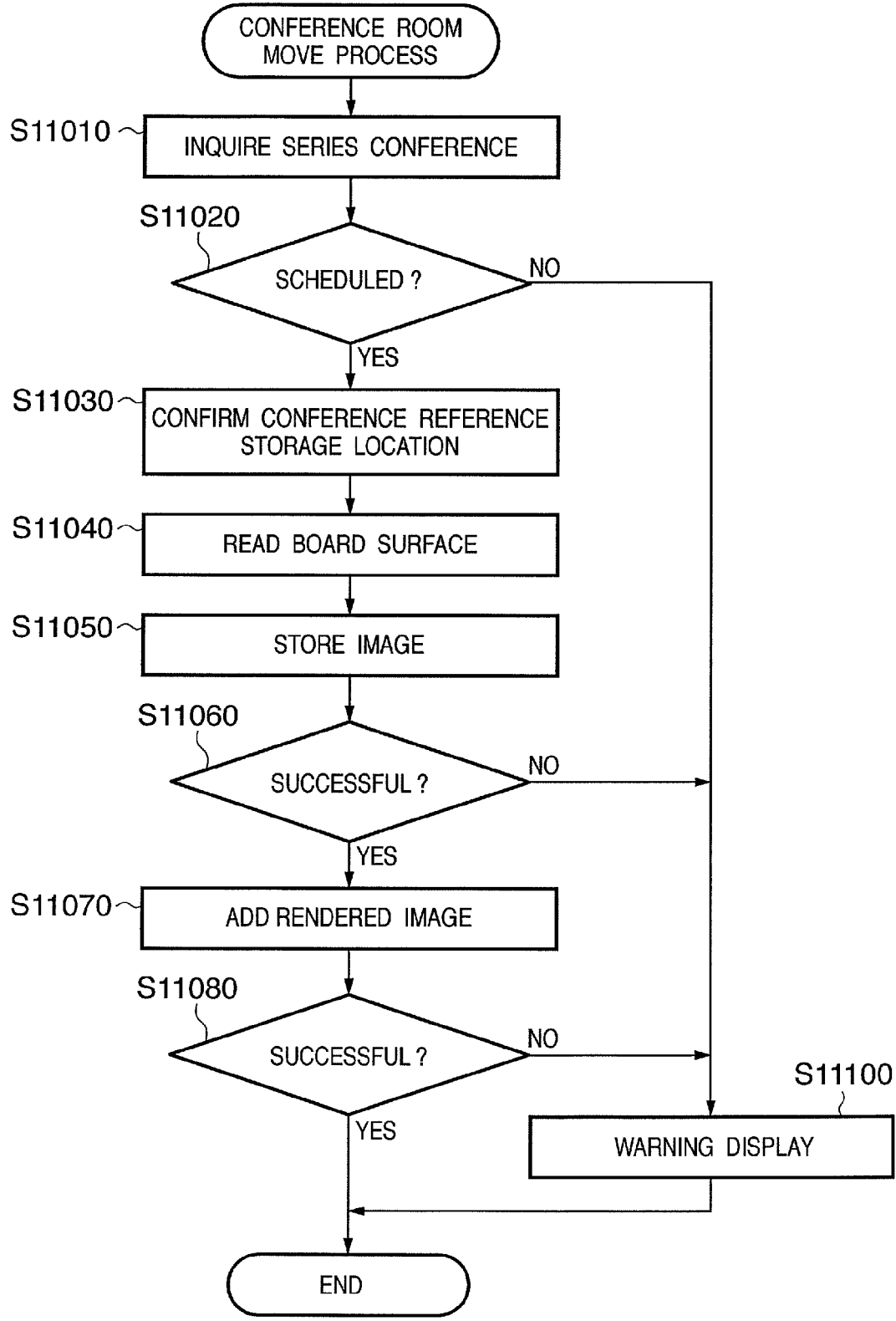
FIG. 11 is a flowchart showing details of conference room move process according to the first embodiment of the present invention.

FIG. 11 is a flowchart showing details of the conference room move process according to the first embodiment of the present invention.

This process is executed to re-use the image on the board surface of the electronic blackboard placed in the current conference room.

In step S11010, the CPU 2001 sends to the conference management server 1011 an inquiry about the presence/absence of a series conference, and acquires the schedule ID of the series conference as a response. Note that the inquiry request to the conference management server 1011 includes the schedule ID of the current conference.

The CPU 2001 checks in step S11020 based on the inquiry result if a series conference is scheduled to be held. If a series conference is not scheduled to be held (NO in step S11020), the process advances to step S11100 to execute a warning display on the operation unit 2012, thus ending the process. On the other hand, if a series conference is scheduled to be held (YES in step S11020), the process advances to step S11030.

In step S11030, the CPU 2001 sends an inquiry about the conference reference storage location used in the conference after movement to another conference room using the schedule ID acquired in step S11010. In step S11040, the CPU 2001 reads an image on the board surface and generates image data of the read image. In step S11050, the CPU 2001 stores the image generated in step S11040 in the conference reference storage location acquired in step S11030. The CPU 2001 acquires an ID of that image data.

The CPU 2001 checks in step S11060 if the storage process has succeeded. If the storage has failed (NO in step S11060), the process advances to step S11100 to execute a warning display on the operation unit 2012, thus ending the process. On the other hand, if the storage process has succeeded (YES in step S11060), the process advances to step S11070.

In step S11070, the CPU 2001 sends a request to the conference management server 1011 to add the image stored in step S11050 as a conference reference. Since it is desirable to render this image first on the board surface of the electronic blackboard after movement, that image is added to the conference reference storage location after its order is controlled to be rendered first.

The CPU 2001 checks in step S11080 if the request to the conference management server 1011 has succeeded. If the request has failed (NO in step S11080), the process advances to step S11100 to execute a warning display on the operation unit 2012, thus ending the process. On the other hand, if the request has succeeded (YES in step S11080), the process ends.

As described above, according to the first embodiment, the conference aided system which develops the electronic blackboard, that can render externally acquired image data, and can store image data generated by reading the board surface in an external storage device, in collaboration with the conference management server, is provided. With this system, the conference reference which is prepared in advance and is used in the conference can be automatically rendered on the electronic blackboard placed in the conference room.

Upon moving to another conference room used in the conference, image data rendered on the board surface of the electronic blackboard in the conference room before movement can be automatically rendered on that in the conference room after movement. Therefore, the conference can be smoothly managed.

<Second Embodiment>

In the first embodiment, as has been described using FIG. 9, the user authentication process and conference start process are independently done as user's operations on the electronic blackboard. However, after the user authentication has succeeded, the conference start process can be subsequently executed. As a result, the need for user's operations can be further cut out.

<Third Embodiment>

In the first and second embodiments, as has been described using FIG. 9, the conference end process and conference room move process are independently done as user's operations of the electronic blackboard. After the conference end process is done, the conference room move process is executed first, and the conference start process can then be executed. As a result, the need for user's operations can be further cut out.

<Fourth Embodiment>

Figure 12:
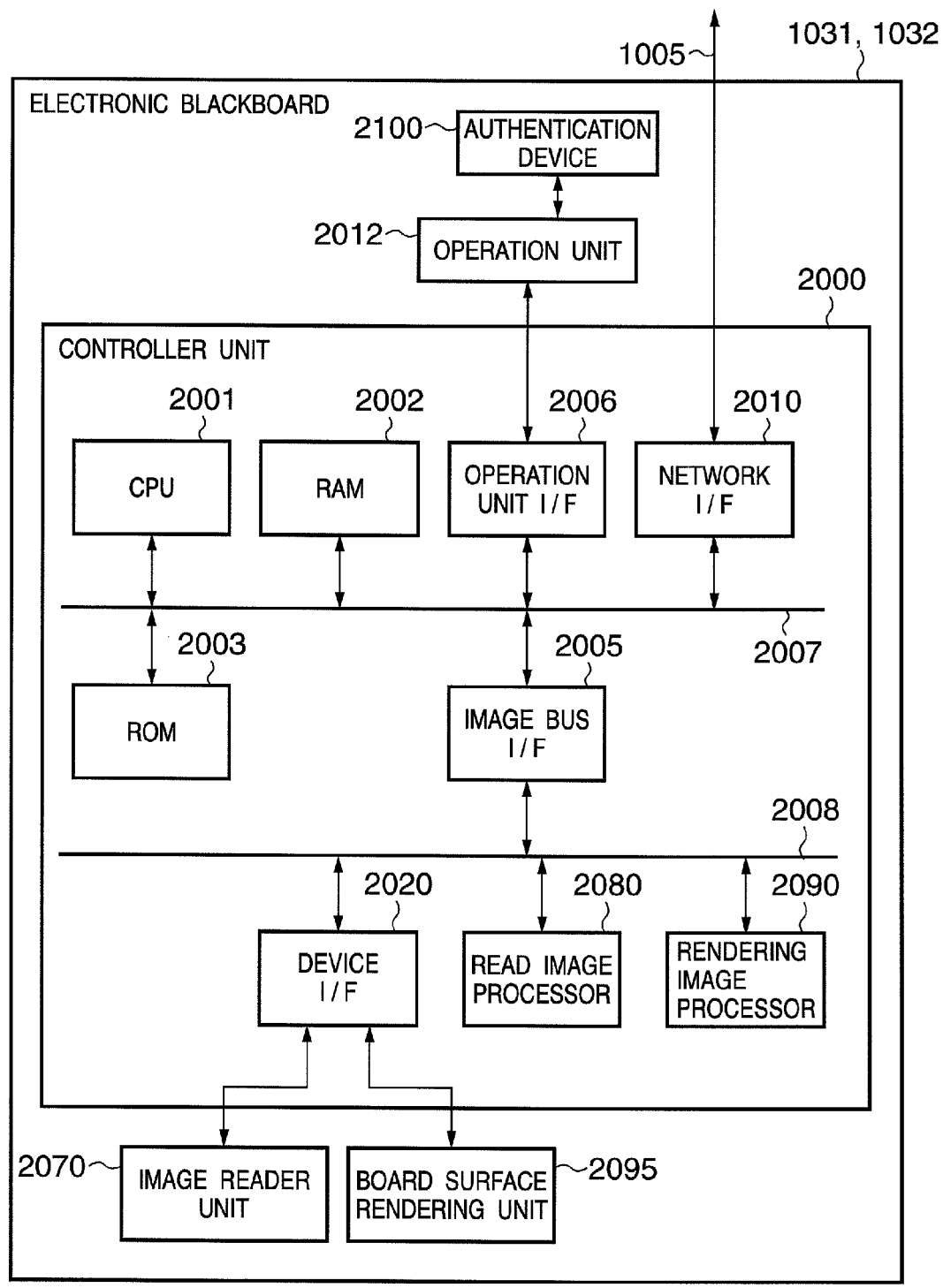
FIG. 12 is a block diagram showing the arrangement of principal part of an electronic blackboard according to the fourth embodiment of the present invention.

In the first to third embodiments, the user authentication process at the electronic blackboard is implemented by inputting the user name and password to the operation unit. However, the present invention is not limited to such specific process. For example, an authentication device 2100 may be connected to the electronic blackboard, as shown in FIG. 12, and various other user authentication methods such as IC card authentication, fingerprint authentication, and the like may be adopted instead. In this case, as the user information of the conference management server 1011, information required to execute authentication in the authentication device 2100 must be held. By using such information, upon detection that all the members of a given conference held so far have left the conference room of interest, the rendering process on the board surface may start. In this way, the rendering process can be completed earlier, thus immediately re-starting the next conference.

<Fifth Embodiment>

Figure 13:
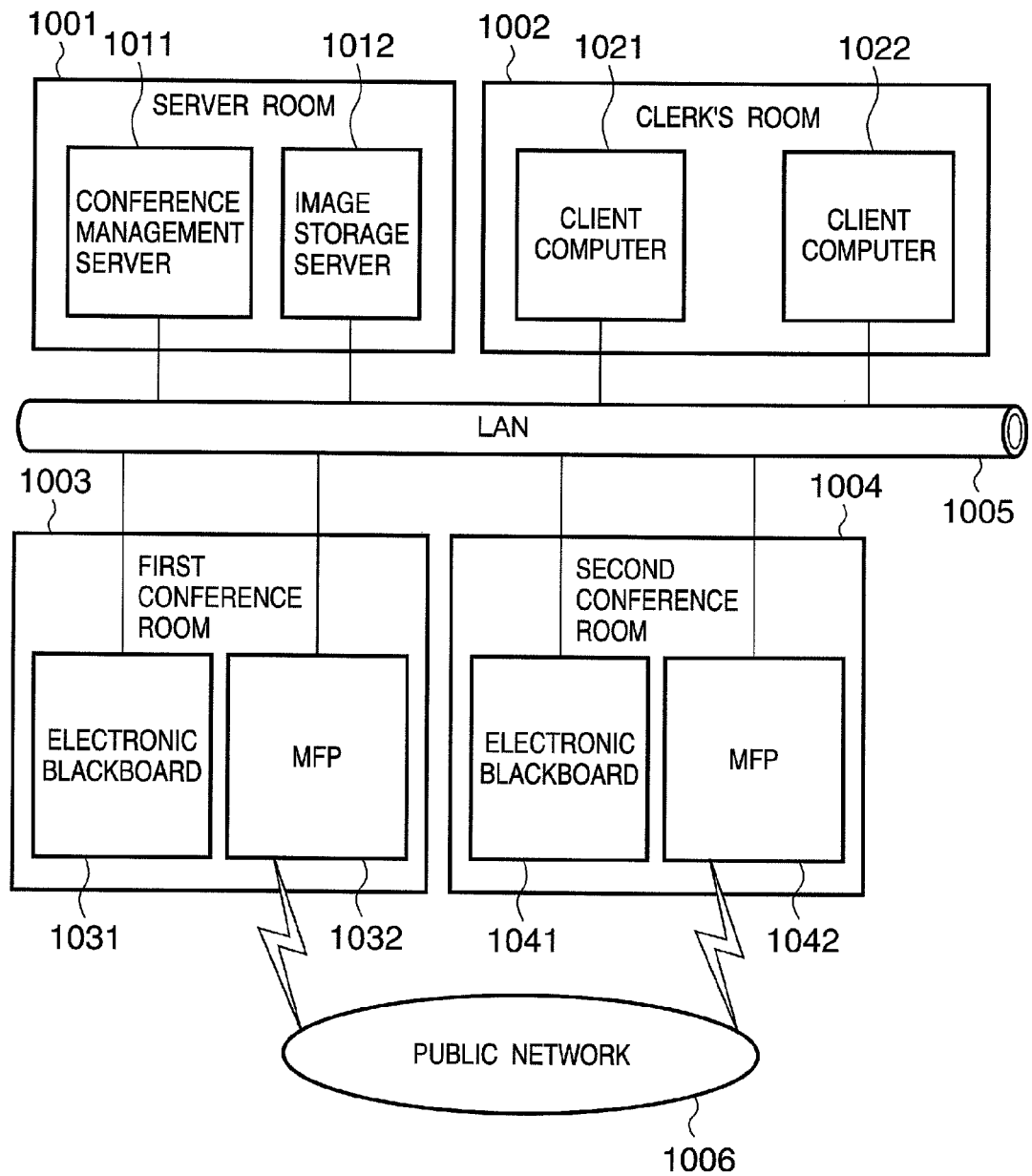
FIG. 13 is a network diagram for explaining the network arrangement of a conference aided system according to the fifth embodiment of the present invention.

In the first to fourth embodiments, as the conference reference storage locations, image data are stored in the boxes in the hard disks of the MFPs 1032 and 1042. However, the present invention is not limited to such specific locations. For example, the network arrangement may include an image storage server 1012 which publishes a shared file system, and the conference references may be stored in such server, as shown in FIG. 13.

In this case, the address information of each conference reference storage location holds the address and folder path name information of the image storage server 1012, and file name information. In addition to re-rendering of the stored information on the board surface, and printing out and displaying such information using a computer terminal, various other modifications such as projection on a screen using slide films and the like are available.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-349450 filed on Dec. 2, 2005, which is hereby incorporated by reference herein in its entirety.

What is claimed is:

1. A conference aided system, which is configured by interconnecting a conference management server, an input board having a board surface and used to input handwritten information, and a storage device via a network, and aids execution of process associated with a conference, wherein the conference management server comprises:
a storage unit adapted to store address information which indicates a storage location of conference reference used in a conference; and
a transmission unit adapted to transmit, to the input board, the address information corresponding to an acquisition request of the address information, which is acquired from said storage unit in response to the acquisition request from the input board, and the input board comprises:
a request unit adapted to request, on the basis of user's operation, of the conference management server, address information indicating a storage location of conference reference used in the conference utilizing the input board by transmitting, to the conference management server, conference room information specifying a conference room where the input board is set;
a reception unit adapted to receive the address information corresponding to a request by said request unit from the conference management server;
an acquisition unit adapted to acquire the conference reference from the storage device, which is designated by the address information received by said reception unit; and
a rendering unit adapted to render the conference reference acquired by said acquisition unit on the board surface of the input board,
wherein the request unit does not require a user to input the conference room information; and wherein the address information received by said reception unit is decided, by the conference management server, based on the conference room information.

2. The system according to claim 1, wherein the storage device stores the conference reference to be stored in a designated order.

3. The system according to claim 1, wherein the storage device is included in a multi-functional peripheral equipment on the network.

4. The system according to claim 1, wherein the storage device is included in a server on the network, which builds a shared file system.

5. The system according to claim 1, wherein the conference management server further comprises: a first authentication unit adapted to authenticate a user of a client which requests access to the conference management server.

6. The system according to claim 1, wherein said storage unit further stores, as conference information:
    user information associated with a user;
    group information associated with a group including a plurality of users;
    conference entity information indicating the users as members of a conference;
    the conference room information associated with a conference room to be managed;
    equipment information associated with an equipment connected on the network; and
    schedule information associated with a schedule upon using the conference room.

7. The system according to claim 6, wherein the input board further comprises:
    an operation unit adapted to input information; and
    a second authentication unit adapted to authenticate a user who operates the input board, and said second authentication unit transmits user information input from said operation unit to the conference management server, and authenticates the user who operates the input board based on a comparison result between that user information and the user information managed in the conference information by the conference management server.

8. The system according to claim 7, wherein when the authentication by said second authentication unit has succeeded, said acquisition unit acquires conference reference from the storage device, which is designated by the address information received by said reception unit.

9. The system according to claim 1, wherein the input board further comprises:
    an operation unit adapted to input information, and
    when a conference start instruction is input via said operation unit, said acquisition unit acquires conference reference from the storage device, which is designated by the address information received by said reception unit.

10. The system according to claim 1, wherein the input board further comprises:
    an operation unit adapted to input information; and
    a board surface read unit adapted to read an image on the board surface of the input board, and when an instruction to re-use the image on the board surface of the input board placed in a current conference room is input from said operation unit, said board surface read unit reads the image on the board surface of the input board, and stores the read image in the storage device, which is designated by the address information in conference information corresponding to the current conference.

11. The system according to claim 10, wherein said board surface read unit stores the image read from the board surface of the input board in the storage device, which is designated by the address information in the conference information corresponding to a next conference, so that the image is to be rendered first on the input board in a conference room used to hold the next conference.

12. The system according to claim 1, wherein the address information received by said reception unit is decided, by the conference management server, based on the conference room information and time information indicating time when said request unit requested the address information.

13. An input board which is connected to a conference management server and a storage device via a network, comprising:
    a request unit adapted to request, on the basis of user's operation, of the conference management server, address information indicating a storage location of conference reference used in the conference utilizing the input board by transmitting, to the conference management server, conference room information specifying a conference room where the input board is set;
    a reception unit adapted to receive the address information from the conference management server;
    an acquisition unit adapted to acquire the conference reference from the storage device, which is designated by the address information received by said reception unit; and
    a rendering unit adapted to render the conference reference acquired by said acquisition unit,
    wherein the request unit does not require a user to input the conference room information; and
    wherein the address information received by said reception unit is decided, by the conference management server, based on the conference room information.

14. The input board according to claim 13, further comprising a storage unit adapted to store the conference reference rendered by said rendering unit into the storage device.

15. The input board according to claim 14, wherein said storage unit stores the conference reference rendered by said rendering unit in the storage device, which is designated by address information corresponding to a next conference.

16. The input board according to claim 15, wherein said request unit requests, of the conference management server, address information corresponding to the next conference.

17. The input board according to claim 13, further comprising an authentication unit adapted to authenticate a user operating the input board;
    wherein when the user authentication has succeeded by said authentication unit, the authentication unit permits the user to operate the input board.

18. The input board according to claim 13, wherein the address information received by said reception unit is decided, by the conference management server, based on the conference room information and time information indicating time when said request unit requested the address information.

19. A method of controlling an input board which is connected to a conference management server and a storage device via a network, comprising:
    a request step of requesting, on the basis of user's operation, of the conference management server, address information indicating a storage location of conference reference used in the conference utilizing the input board by transmitting, to the conference management server, conference room information specifying a conference room where the input board is set;
    a reception step of receiving the address information from the conference management server;

an acquisition step of acquiring the conference reference from the storage device, which is designated by the address information received in the reception step; and a rendering step of rendering the conference reference acquired in the acquisition step, wherein the request step does not require a user to input the conference room information; and wherein the address information received at the reception step is decided, by the conference management server, based on the conference room information.

20. A program stored in a computer-readable memory, for making a computer execute control of an input board which is connected to a conference management server and a storage device via a network, comprising:

a request step of requesting, on the basis of user's operation, of the conference management server, address information indicating a storage location of conference reference used in the conference utilizing the input board by transmitting, to the conference management server, conference room information specifying a conference room where the input board is set;

a reception step of receiving the address information from the conference management server;

an acquisition step of acquiring the conference reference from the storage device, which is designated by the address information received in the reception step; and a rendering step of rendering the conference reference acquired in the acquisition step, wherein the request step does not require a user to input the conference room information; and wherein the address information received at the reception step is decided, by the conference management server, based on the conference room information.

* * * * *